(12) United States Patent
Hanami et al.

(10) Patent No.: US 10,371,341 B2
(45) Date of Patent: Aug. 6, 2019

(54) VEHICLE LAMP

(71) Applicant: KOITO MANUFACTURING CO., LTD., Tokyo (JP)

(72) Inventors: Shota Hanami, Shizuoka (JP); Fumitaka Ichinohe, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 15/428,483

(22) Filed: Feb. 9, 2017

(65) Prior Publication Data

US 2017/0234501 A1 Aug. 17, 2017

(30) Foreign Application Priority Data

Feb. 17, 2016 (JP) ................. 2016-027654

(51) Int. Cl.
| | | |
|---|---|---|
| *F21S 43/237* | (2018.01) | |
| *F21S 43/239* | (2018.01) | |
| *F21S 43/241* | (2018.01) | |
| *F21S 43/245* | (2018.01) | |
| *F21S 43/247* | (2018.01) | |
| *F21S 43/14* | (2018.01) | |
| *F21V 8/00* | (2006.01) | |
| *F21S 43/249* | (2018.01) | |

(52) U.S. Cl.
CPC ............ *F21S 43/237* (2018.01); *F21S 43/14* (2018.01); *F21S 43/239* (2018.01); *F21S 43/241* (2018.01); *F21S 43/245* (2018.01); *F21S 43/247* (2018.01); *F21S 43/249* (2018.01); *G02B 6/001* (2013.01); *G02B 6/0006* (2013.01); *G02B 6/0036* (2013.01)

(58) Field of Classification Search
CPC ........ F21S 43/14; F21S 43/237; F21S 43/239; F21S 43/241; F21S 43/245; F21S 43/247; F21S 43/249; F21S 48/2237; G02B 6/0006; G02B 6/001; G02B 6/0036
USPC .......................................................... 362/511
See application file for complete search history.

(56) References Cited

U.S. PATENT DOCUMENTS

| | | | | |
|---|---|---|---|---|
| 6,733,166 B2 * | 5/2004 | Hulse | ................. | G02B 6/0005 362/33 |
| 7,290,906 B2 * | 11/2007 | Suzuki | ................. | B60Q 1/2696 362/511 |

(Continued)

FOREIGN PATENT DOCUMENTS

JP          2014-007014 A          1/2014

*Primary Examiner* — Tsion Tumebo
(74) *Attorney, Agent, or Firm* — Abelman, Frayne & Schwab (57) ABSTRACT

A vehicle lamp includes a light source and a light guide body configured to guide light from the light source therein and emit the light toward a front side of the lamp. The light guide body includes a first rod-shaped light guide portion configured to guide light incident from an incident end surface, a second rod-shaped light guide portion configured to guide the incident light, and a plate-shaped light guide portion formed in an area between the first rod-shaped light guide portion and the second rod-shaped light guide portion. The plate-shaped light guide portion has an end side surface configured to totally reflect at least a portion of light, which travels in the plate-shaped light guide portion, toward the first rod-shaped light guide portion and/or the second rod-shaped light guide portion.

12 Claims, 9 Drawing Sheets

(56) References Cited

U.S. PATENT DOCUMENTS

| | | | | |
|---|---|---|---|---|
| 7,695,179 | B2* | 4/2010 | Eichelberger | F21S 48/215 |
| | | | | 362/23.13 |
| 8,920,007 | B2* | 12/2014 | Yang | B60Q 1/0047 |
| | | | | 362/511 |
| 9,242,594 | B2* | 1/2016 | Nakada | G02B 6/002 |
| 9,669,754 | B2* | 6/2017 | Tatara | B60R 11/04 |
| 9,939,123 | B2* | 4/2018 | Nakada | F21S 43/26 |
| 10,072,813 | B2* | 9/2018 | Koizumi | B60Q 1/2607 |
| 2006/0198158 | A1* | 9/2006 | Nagabuchi | F21V 7/0091 |
| | | | | 362/511 |
| 2007/0290829 | A1* | 12/2007 | Geiger | B60Q 1/2665 |
| | | | | 340/475 |
| 2011/0194308 | A1* | 8/2011 | Lin | G02B 6/0061 |
| | | | | 362/612 |
| 2012/0051077 | A1* | 3/2012 | Arai | F21S 41/141 |
| | | | | 362/516 |
| 2012/0069592 | A1* | 3/2012 | Natsume | B60Q 1/0052 |
| | | | | 362/511 |
| 2013/0114277 | A1* | 5/2013 | Faffelberger | B60Q 1/04 |
| | | | | 362/511 |
| 2014/0211449 | A1* | 7/2014 | Nomura | B60Q 1/302 |
| | | | | 362/84 |
| 2016/0102834 | A1* | 4/2016 | Yamada | G02B 6/0061 |
| | | | | 362/511 |
| 2016/0207444 | A1* | 7/2016 | Tatara | B60R 11/04 |

\* cited by examiner

FIG. 11 ly, Japanese Patent Application No. 2016-027654, filed on Feb.
VEHICLE LAMP

CROSS-REFERENCE TO RELATED APPLICATIONS

This application is based on and claims priority from Japanese Patent Application No. 2016-027654, filed on Feb. 17, 2016, with the Japan Patent Office, the disclosure of which is incorporated herein in its entirety by reference.

TECHNICAL FIELD

The present disclosure relates to a vehicle lamp, and more particularly, to a vehicle lamp using a light guide body.

BACKGROUND

Conventionally, a vehicle lamp in which a plate-shaped light guide plate between two rod-shaped light guide bodies to increase a light-emitting area, thereby improving visibility has been known. For example, Japanese Patent Laid-Open Publication No. 2014-007014 discloses a vehicle lamp that includes a first light guide body extending from a light incident portion so that light from the light-incident portion is guided thereto, a second light guide body extending through a branch portion between the first light guide body and the second light guide body so that light from the light incident portion is guided thereto, and a flat light guide plate formed between the first light guide body and the second light guide body.

SUMMARY

In the vehicle lamp disclosed in Japanese Patent Laid-open Publication No. 2014-007014, although a light-emitting area may be increased, there is a possibility that uniform light emission may not be realized because the light traveling in the flat light guide plate leaks from the end side surfaces of the flat light guide plate, and thus, the light emission intensity of the end side surfaces of the plate-shaped light guide plate is increased.

The present disclosure has been made in consideration of the aforementioned situation, and is to suppress the light emission intensity of the end side surfaces of a plate-shaped light guide portion in a vehicle lamp including a light guide body in which the plate-shaped light guide portion is formed between two rod-shaped light guide portions.

According to an aspect of the present disclosure, a vehicle lamp includes a light source and a light guide body configured to guide light from the light source therein and emit the light toward a front side of the lamp. The light guide body includes a first rod-shaped light guide portion configured to guide light incident from an incident end surface, a second rod-shaped light guide portion configured to guide the incident light, and a plate-shaped light guide portion formed in an area between the first rod-shaped light guide portion and the second rod-shaped light guide portion. The plate-shaped light guide portion has an end side surface configured to totally reflect at least a portion of light, traveling in the plate-shaped light guide portion, toward the first rod-shaped light guide portion and/or the second rod-shaped light guide portion.

The end side surface may be formed as a curved surface that is recessed toward the incident end surface side.

A portion of the first rod-shaped light guide portion near the incident end surface may be curved and may be formed so that a diameter thereof is reduced with decreasing distance to the incident end surface.

The first rod-shaped light guide portion and/or the second rod-shaped light guide portion may be provided with a flat surface formed on a portion of a side surface thereof.

The second rod-shaped light guide portion may be formed to branch from the first rod-shaped light guide portion and extend therefrom.

The second rod-shaped light guide portion may be disposed not to intersect with the first rod-shaped light guide portion.

According to the present disclosure, in a vehicle lamp including a light guide body in which a plate-shaped light guide portion is formed between two rod-shaped light guide portions, the light emission intensity of the end side surface of the plate-shaped light guide portion can be suppressed.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

Hereinafter, a vehicle lamp according to exemplary embodiments of the present disclosure will be described in detail with reference to the accompanying drawings. In addition, in the present specification, when terms expressing directions, such as, for example, "up," "down," "front," "rear," "left," and "right," are used, these terms mean the directions in the attitude of the vehicle lamp when the vehicle lamp is mounted on a vehicle.

Figure 1:
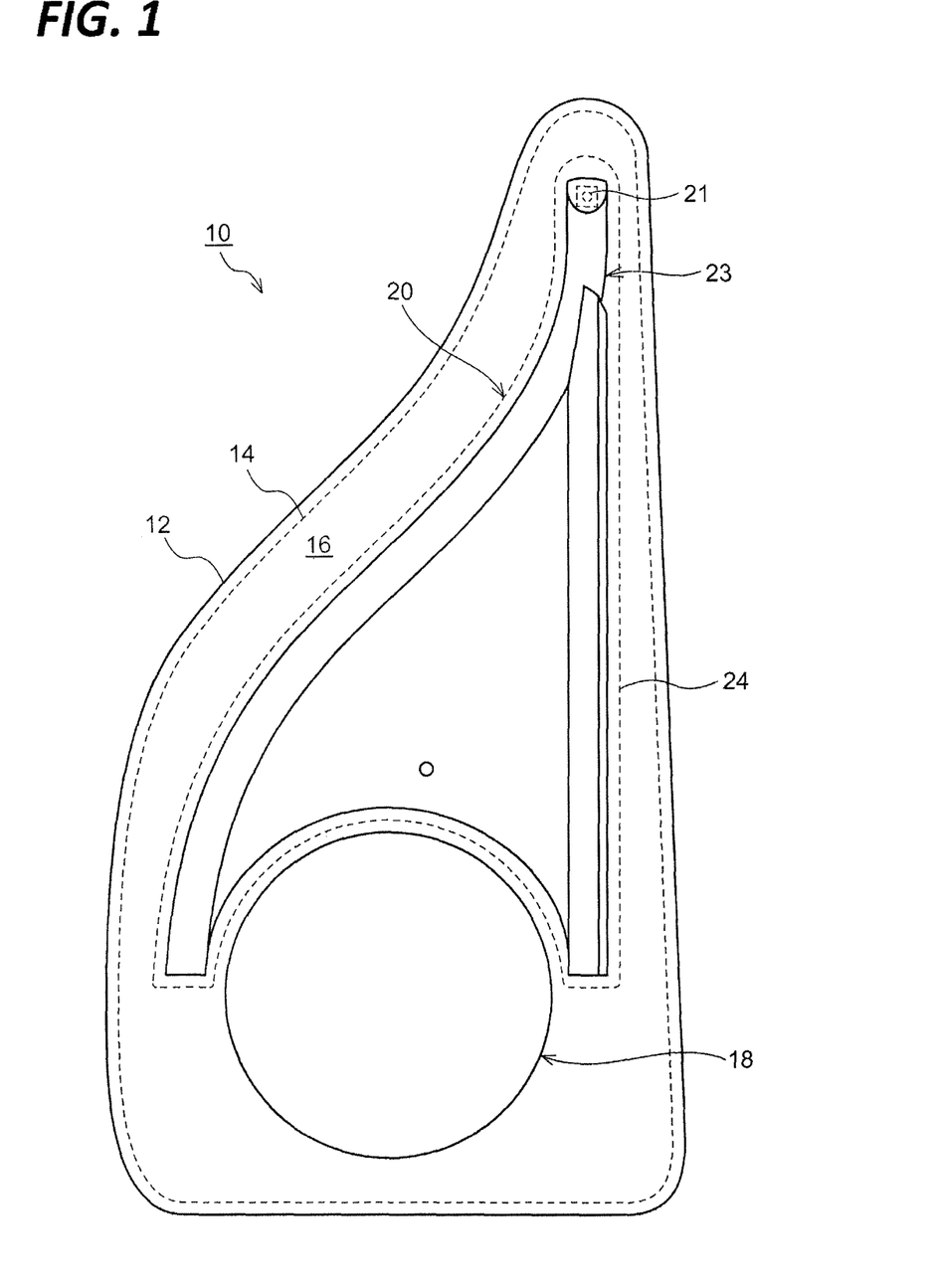
FIG. 1 is a schematic front view for explaining a vehicle lamp according to an exemplary embodiment of the present disclosure.

FIG. 1 is a schematic front view for explaining a vehicle lamp 10 according to an exemplary embodiment of the present disclosure. The vehicle lamp 10 illustrated in FIG. 1 is a rear combination lamp mounted on the rear side of a vehicle.

As illustrated in FIG. 1, the vehicle lamp 10 includes a lamp body 12, and a transparent outer cover 14 that covers a front opening of the lamp body 12. The lamp body 12 and the outer cover 14 define a lamp chamber 16, and a backup lamp 18 and a tail lamp 20 are installed within the lamp chamber 16. The backup lamp 18 and the tail lamp 20 are fixedly supported by the lamp body 12.

As illustrated in FIG. 1, the backup lamp 18 is disposed in the lower region of the lamp chamber 16 when viewed from the front side. The structure of the backup lamp 18 is not particularly limited. For example, a reflector type lamp may be used which reflects light emitted from a light source, such as, for example, a bulb or an LED, using a reflector.

In the vehicle lamp 10 according to the present exemplary embodiment, the tail lamp 20 is disposed at the upper side of the backup lamp 18. The tail lamp 20 includes an LED 21 as a light source, a light guide body 23 that guides light from the LED 21 therein to emit the light toward the front side of the lamp, and a red inner lens 24 that controls the light emitted from the light guide body 23. In the present exemplary embodiment, although a red transparent lens, which is colored red and has translucency, is used as the inner lens, a colorless transparent inner lens and a red transparent outer cover (lens) may be used.

Figure 2:
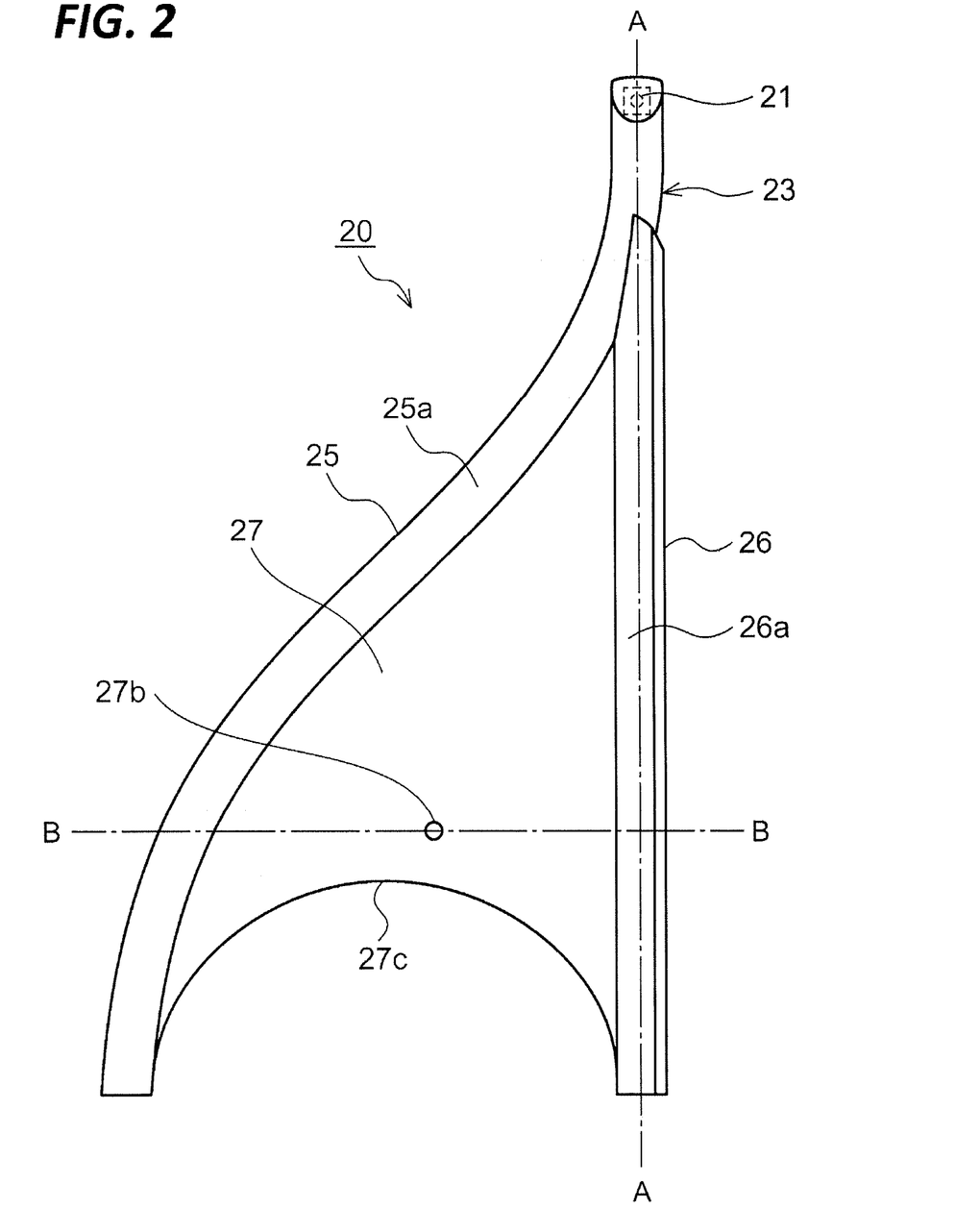
FIG. 2 is a schematic front view of a tail lamp.
Figure 3:
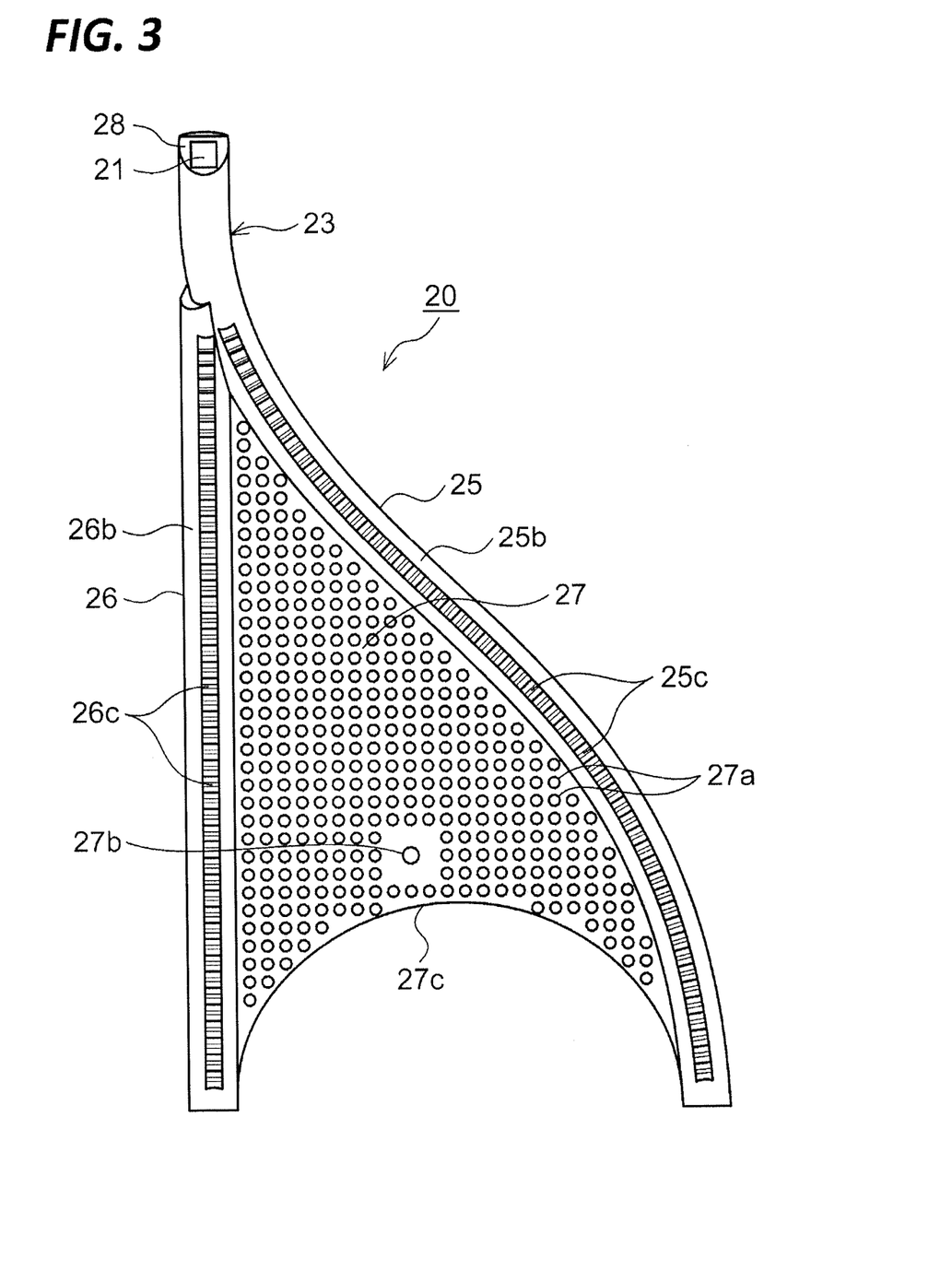
FIG. 3 is a schematic rear view of a light guide body.
Figure 4:
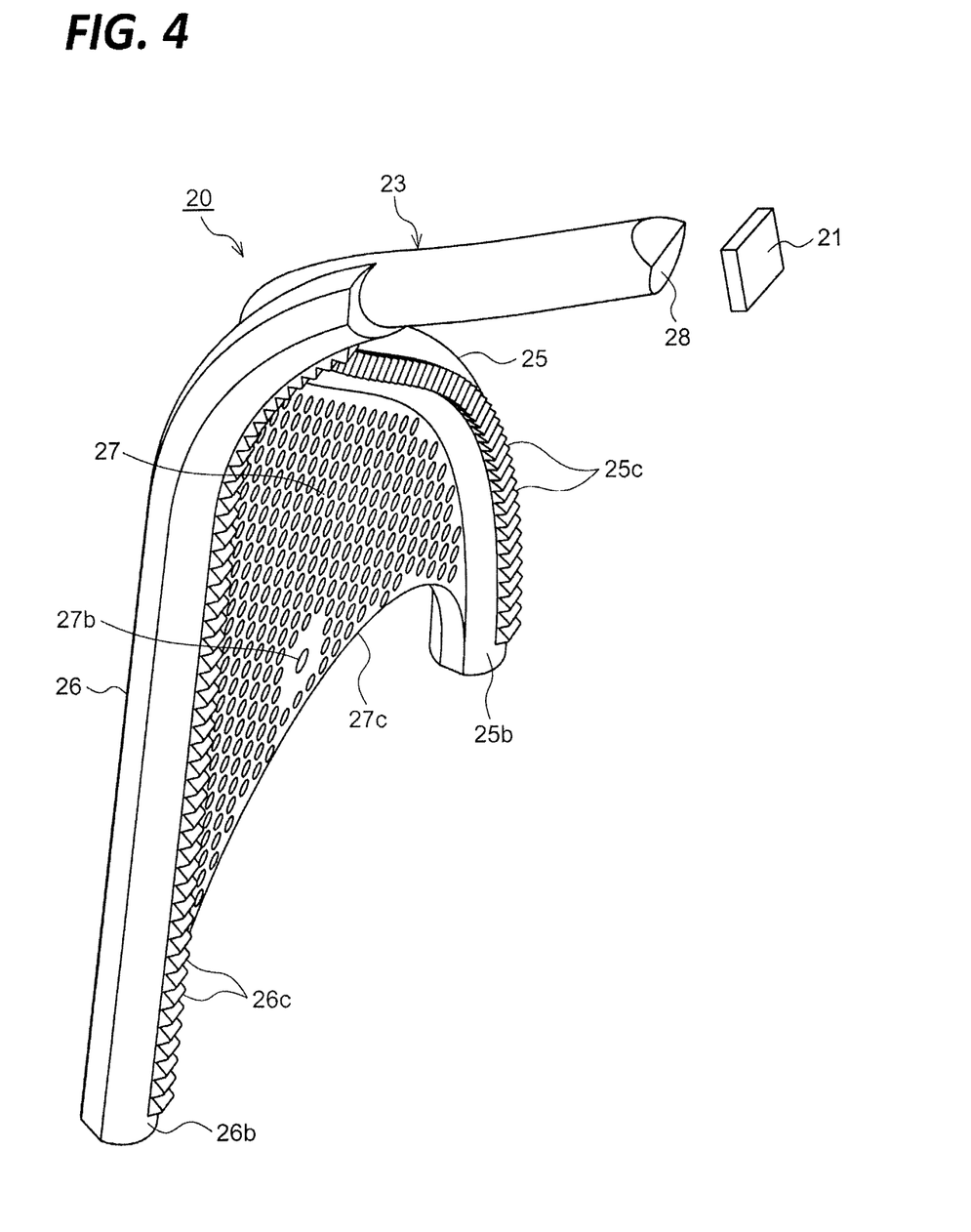
FIG. 4 is a schematic perspective view of the light guide body.
Figure 5:
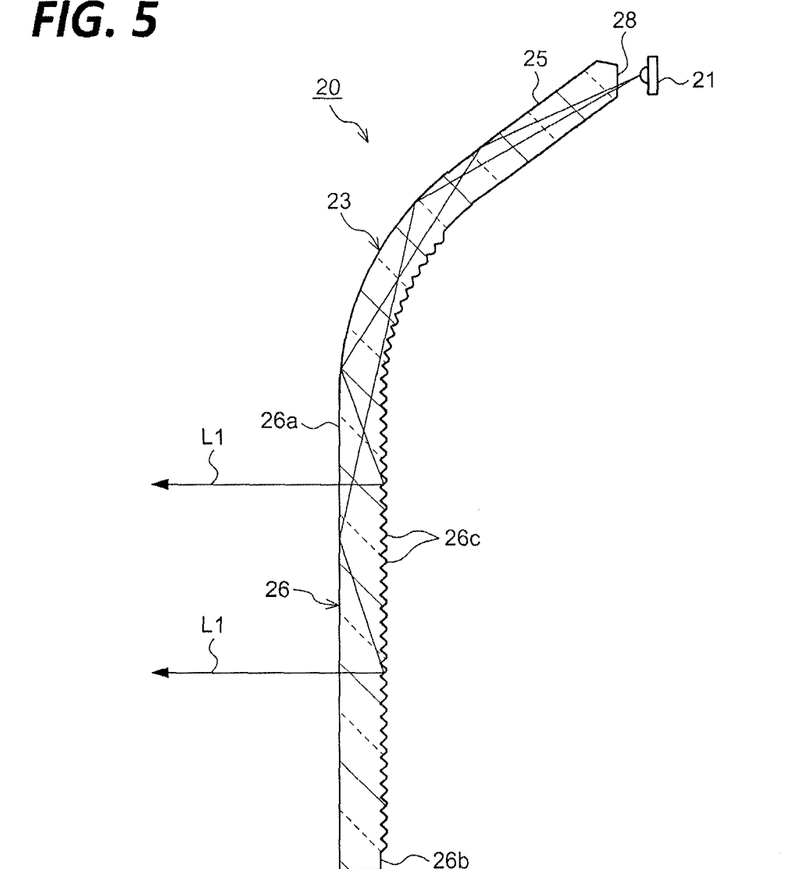
FIG. 5 is a cross-sectional view taken along line A-A of the light guide body illustrated in FIG. 2.
Figure 6:
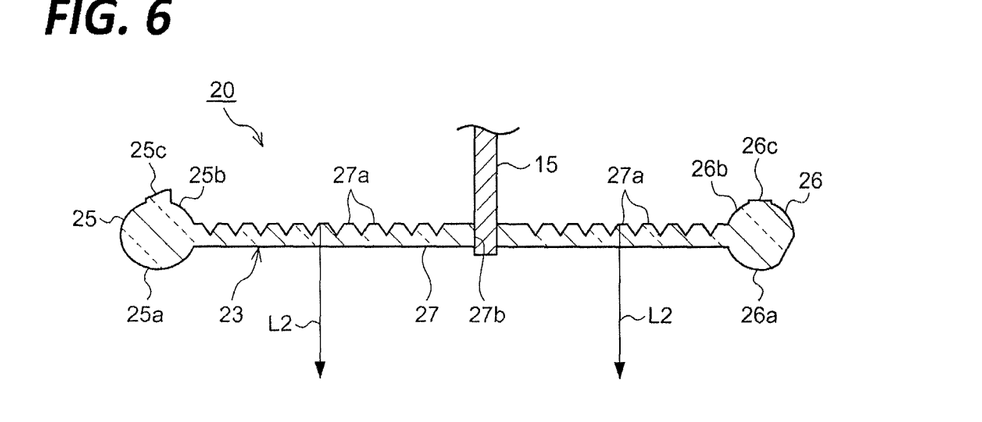
FIG. 6 is a cross-sectional view taken along line B-B of the light guide body illustrated in FIG. 2.
Figure 7:
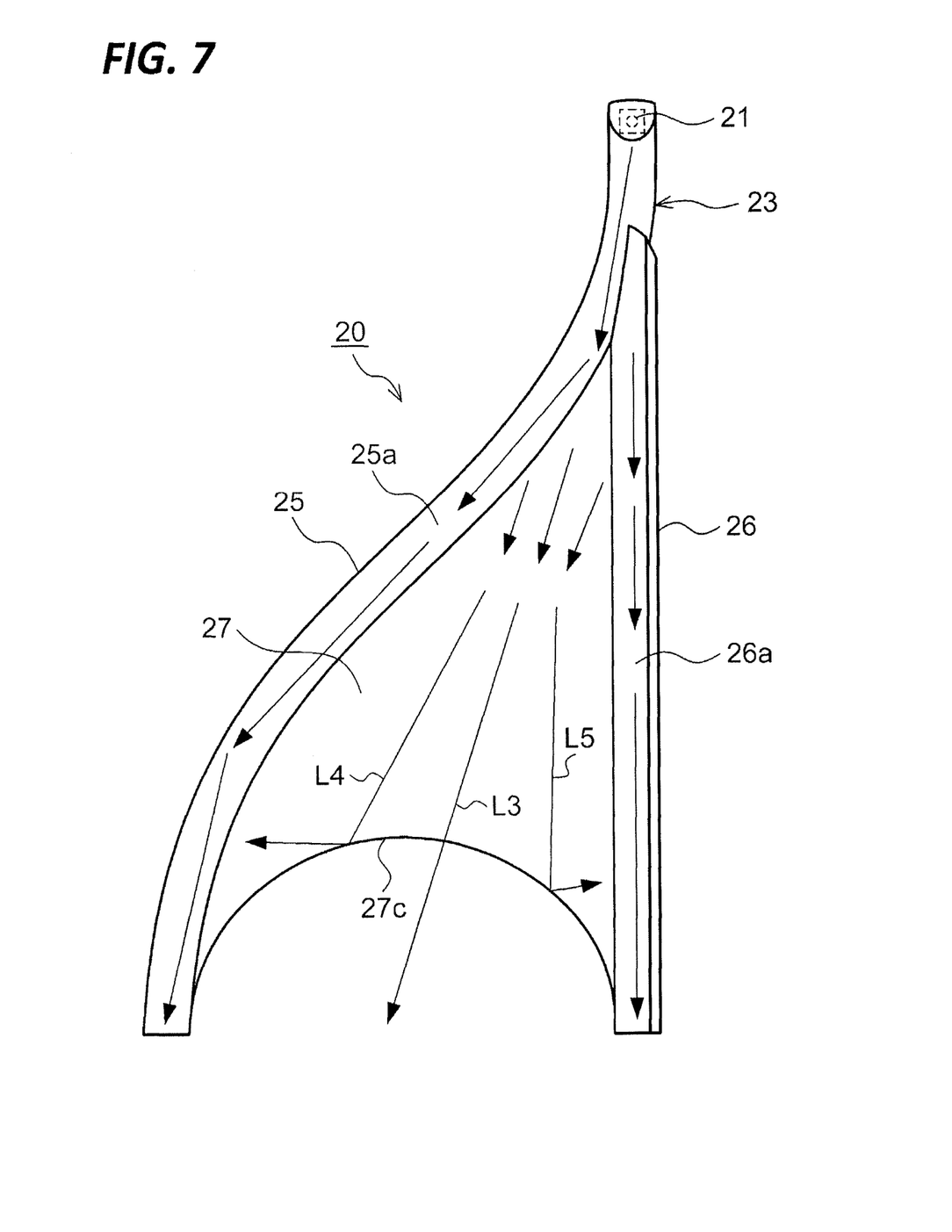
FIG. 7 is a view illustrating how light travels inside the light guide body.

FIG. 2 is a schematic front view of the tail lamp 20. FIG. 3 is a schematic rear view of the light guide body 23. FIG. 4 is a schematic perspective view of the light guide body 23. FIG. 5 is a cross-sectional view taken along line A-A of the light guide body 23 illustrated in FIG. 2. FIG. 6 is a cross-sectional view taken along line B-B of the light guide body 23 illustrated in FIG. 2. FIG. 7 is a view illustrating the state where light travels inside the light guide body 23.

The light guide body 23 includes a first rod-shaped light guide portion 25, a second rod-shaped light guide portion 26, and a plate-shaped light guide portion 27 formed in the area between the first rod-shaped light guide portion 25 and the second rod-shaped light guide portion 26. In the light guide body 23, the first rod-shaped light guide portion 25, the second rod-shaped light guide portion 26, and the plate-shaped light guide portion 27 are integrally formed. The light guide body 23 may be formed by extrusion molding a transparent resin, such as, for example, acryl.

The first rod-shaped light guide portion 25 has an incident end surface 28 on one end surface thereof, on which the light from the LED 21 is incident. In the present exemplary embodiment, the incident end surface 28 is formed to face the rear side of the lamp. The LED 21 is disposed to face the incident end surface 28.

The second rod-shaped light guide portion 26 is formed to branch from the first rod-shaped light guide portion 25 near the incident end surface 28 and linearly extend downward. The first rod-shaped light guide portion 25 is curved to extend downward after branching from the second rod-shaped light guide portion 26.

The first rod-shaped light guide portion 25 and the second rod-shaped light guide portion 26 guide the incident light therein to emit the light from respective light-emitting surfaces 25a and 26a along the extending direction thereof (the front surface of the side surfaces of the rod-shaped light guide portion) toward the front side of the lamp. Plural steps 25c and 26c are formed on rear surfaces 25b and 26b of the first rod-shaped light guide portion 25 and the second rod-shaped light guide portion 26 along the extending direction of the rod-shaped light guide portions to reflect the light traveling in the rod-shaped light guide portions toward the light-emitting surfaces 25a and 26a. Each of the steps 25c and 26c may have a triangular pillar shape.

The plate-shaped light guide portion 27 extends from the branch portion of the first rod-shaped light guide portion 25 and the second rod-shaped light guide portion 26 to the vicinity of the upper edge portion of the backup lamp 18 (see FIG. 1) in the area between the first rod-shaped light guide portion 25 and the second rod-shaped light guide portion 26. The plate-shaped light guide portion 27 is bonded to the side surfaces of the first rod-shaped light guide portion 25 and the second rod-shaped light guide portion 26 so as to transmit light. The plate-shaped light guide portion 27 is formed to be thinner than the first rod-shaped light guide portion 25 and the second rod-shaped light guide portion 26.

As illustrated in FIGS. 3 and 4, plural steps 27a are formed on the rear surface of the plate-shaped light guide portion 27 to reflect the light traveling in the plate-shaped light guide portion 27 toward the front side of the lamp. The plural steps 27a may be configured as, for example, indentations. In addition, the plate-shaped light guide portion 27 is provided with a fixing hole 27b. As illustrated in FIG. 6, a support portion 15 extending from the lamp body 12 (see, e.g., FIG. 1) is inserted into the fixing hole 27b, and the light guide body 23 is fixed with respect to the lamp body 12.

The plate-shaped light guide portion 27 has an end side surface 27c, which is close to the upper edge portion of the backup lamp 18 (see, e.g., FIG. 1). The end side surface 27c is the side surface of the plate-shaped light guide portion 27, which is formed between the vicinity of the terminal end of the first rod-shaped light guide portion 25 and the vicinity of the terminal end of the second rod-shaped light guide portion 26. In the present exemplary embodiment, the end side surface 27c of the plate-shaped light guide portion 27 is configured to totally reflect at least a portion of the light traveling in the plate-shaped light guide portion toward the first rod-shaped light guide portion and/or the second rod-shaped light guide portion. Specifically, the end side surface 27c is formed as a curved surface, which is recessed toward the incident end surface 28 side of the light guide body 23.

Next, descriptions will be made on how light travels in the light guide body 23 with reference to FIGS. 5 to 7.

As illustrated in FIG. 5, the light emitted from the LED 21 is incident into the light guide body 23 from the incident end surface 28. The light is split into the first rod-shaped light guide portion 25 and the second rod-shaped light guide portion 26, and travels in the first and second rod-shaped light guide portions while repeating total reflection. While traveling, the light is reflected at the steps formed on the rear surfaces of the first and second rod-shaped light guide portions to be emitted to the front side of the lamp (see, e.g., light beams L1 in FIG. 5).

In addition, a portion of the light traveling in the rod-shaped light guide portions enters the plate-shaped light guide portion 27. The light travels in the plate-shaped light guide portion 27 while repeating total reflection. While traveling, the light is reflected at the steps 27a formed in the rear surface of the plate-shaped light guide portion 27 to be emitted to the front side of the lamp (see, e.g., light beams L2 in FIG. 6).

The light traveling in the plate-shaped light guide portion 27 is not entirely reflected at the steps 27a to be emitted to the front side of the lamp, and a portion of the light reaches the end side surface 27c of the plate-shaped light guide portion 27. As illustrated in FIG. 7, light L3 incident on the central portion of the end side surface 27c is emitted outward from the end side surface 27c. Meanwhile, light L4 and L5 incident on a position deviated from the central portion of the end side surface 27c is totally reflected at the end side surface 27c to be directed to the first rod-shaped light guide portion 25 and the second rod-shaped light guide portion 26.

Assuming that the end side surface 27c is a flat surface, most of the light reaching the end side surface 27c is emitted outward from the end side surface 27c. In this case, there is a possibility that the light emission intensity of the end side surface 27c is increased, and thus uniform light emission may not be realized. Meanwhile, in the tail lamp 20 according to the present exemplary embodiment, because a portion of light incident on the end side surface 27c (e.g., L4 and L5 in FIG. 7) is totally reflected at the end side surface 27c toward the first rod-shaped light guide portion 25 and the second rod-shaped light guide portion 26, the amount of light emitted from the end side surface 27c is reduced, and thus the light emission intensity of the end side surface 27c can be suppressed. As a result, the uniformity of light emission can be improved.

Figure 8:
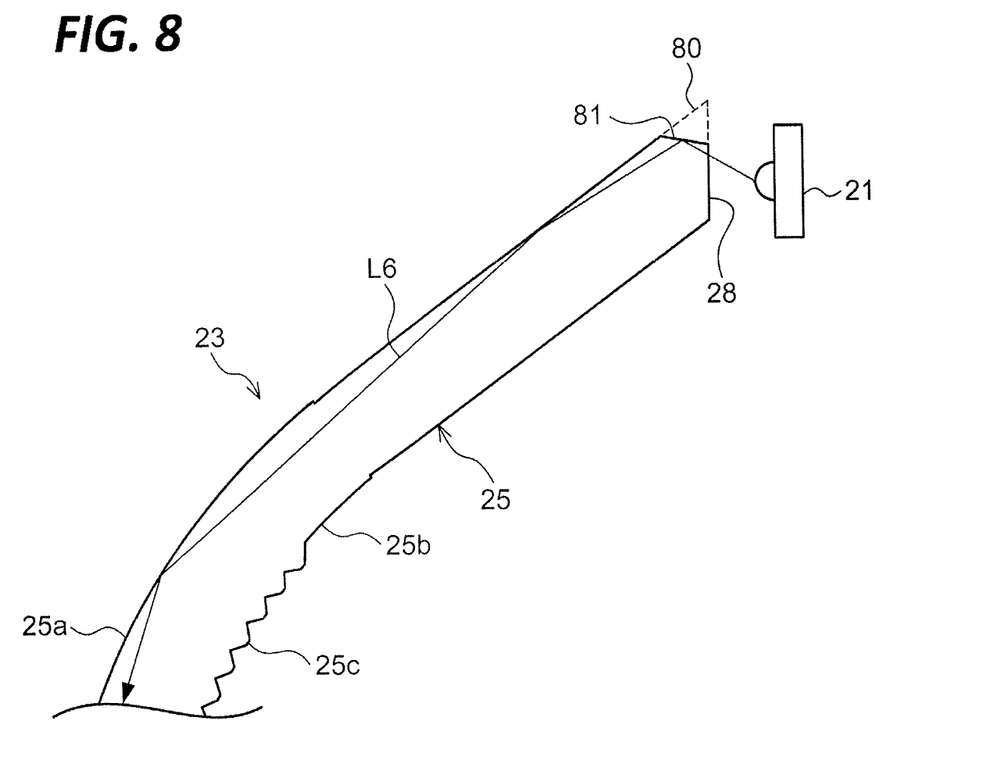
FIG. 8 is an enlarged cross-sectional view of a peripheral portion of the incident end surface of the light guide body.

FIG. 8 is an enlarged cross-sectional view of the peripheral portion of the incident end surface 28 of the light guide body 23. As illustrated in FIG. 8, a portion of the first rod-shaped light guide portion 25 near the incident end surface 28 is curved toward the rear side of the lamp. When the curved portion is present on the first rod-shaped light guide portion 25 in this way, there is a possibility that a portion of light incident into the light guide body may not be totally reflected, and thus may leak outward. Therefore, in the present exemplary embodiment, as illustrated in FIG. 8, the portion of the first rod-shaped light guide portion 25 near the incident end surface 28 is formed such that the diameter thereof is reduced toward the incident end surface 28. More specifically, a portion of the first rod-shaped light guide portion 25 near the incident end surface 28 is cut out. In FIG. 8, a cut-out portion 80 is represented by a dashed line. With the formation of the cut-out portion 80, as illustrated by a light beam L6 in FIG. 8, a portion of the light incident into the first rod-shaped light guide 25 from the incident end surface 28 is totally reflected on the surface 81 formed by cutting out the portion 80, and travels in the first rod-shaped light guide portion 25. With the present exemplary embodiment, even when the portion near the incident end surface 28 is curved, the light incident into the first rod-shaped light guide portion 25 from the incident end surface 28 hardly leaks outward, and therefore light utilization efficiency can be improved.

Figure 9:
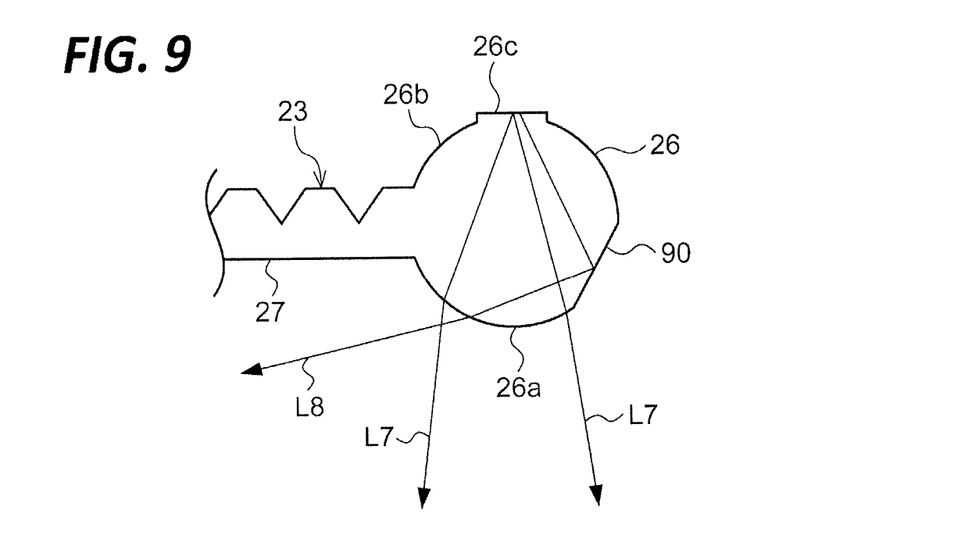
FIG. 9 is an enlarged cross-sectional view of a second rod-shaped light guide portion.

FIG. 9 is an enlarged cross-sectional view of the second rod-shaped light guide portion 26. As described above, light traveling in the second rod-shaped light guide 26 is reflected at the steps 26c formed on the rear surface 26b to be emitted from the light-emitting surface 26a to the front side of the lamp (see, e.g., light beams L7).

In the present exemplary embodiment, as illustrated in FIG. 9, a flat surface 90 is formed on a portion of the side surface of the second rod-shaped light guide portion 26. The flat surface 90 reflects the light from the steps 26c to the lateral side of the lamp (see a light beam L8). When the flat surface 90 is formed on a portion of the side surface of the second rod-shaped light guide portion 26 in this way, the light may be emitted to the lateral side of the lamp as well as the front side of the lamp, and thus the viewing angle of the lamp may be enlarged.

Figure 10:
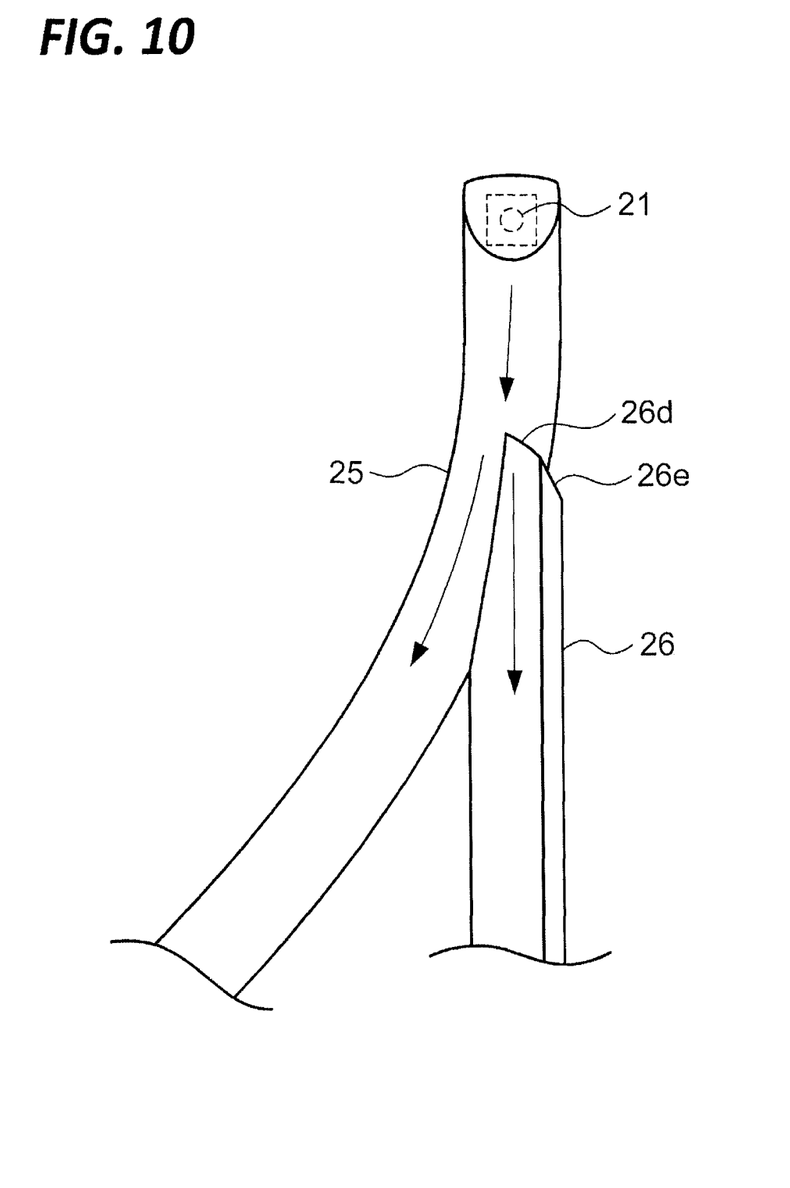
FIG. 10 is an enlarged view of a branch portion of a first rod-shaped light guide portion and a second rod-shaped light guide portion.

FIG. 10 is an enlarged view of a branch portion of the first rod-shaped light guide portion 25 and the second rod-shaped light guide portion 26. As described above, the first rod-shaped light guide portion 25 is curved to extend downward after branching from the second rod-shaped light guide portion 26. Meanwhile, the second rod-shaped light guide portion 26 is formed to linearly extend downward after branching from the first rod-shaped light guide portion 25. In the case where the second rod-shaped light guide portions 25 and 26 branches from each other in this way, when all ends of the second rod-shaped light guide portion 26 are connected to the first rod-shaped light guide portion 25, there is a possibility that most of the light incident into the first rod-shaped light guide portion 25 from the LED 21 enters the second rod-shaped light guide portion 26 and the amount of light entering the first rod-shaped light guide portion 25 is reduced. Therefore, in the present exemplary embodiment, only a portion 26d of the end of the second rod-shaped light guide portion 26 may be connected to the first rod-shaped light guide portion 25, and the remaining portion 26e may be in the open state, rather than being connected to the first rod-shaped light guide portion 25. With this formation, it is possible to suppress the light incident into the first rod-shaped light guide portion 25 from the LED 21 from excessively entering the second rod-shaped light guide portion 26. It is also possible to increase the amount of light entering the first rod-shaped light guide portion 25.

Figure 11:
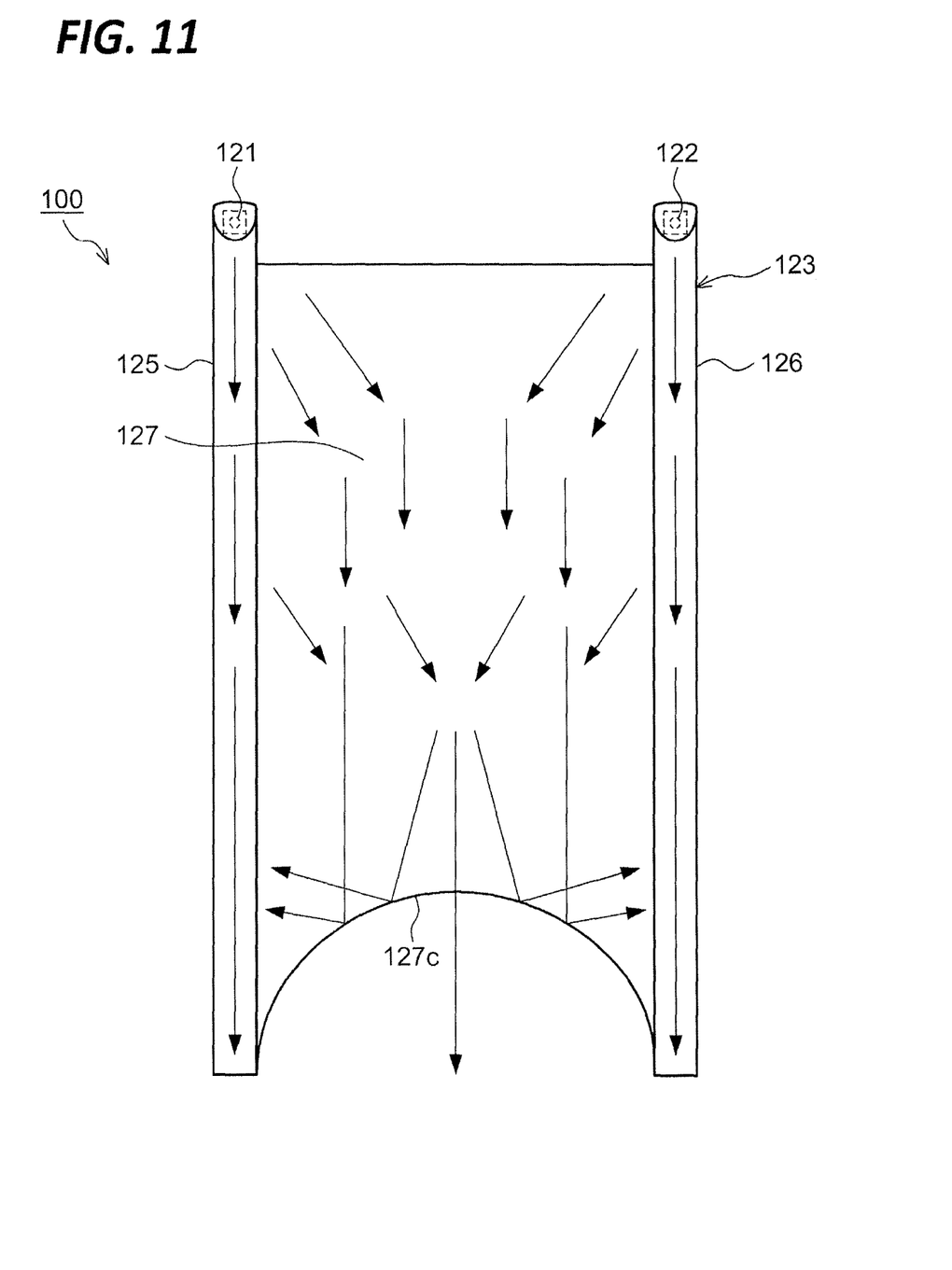
FIG. 11 is a schematic front view for explaining a vehicle lamp according to another exemplary embodiment of the present disclosure.

FIG. 11 is a schematic front view for explaining a vehicle lamp according to another exemplary embodiment of the present disclosure. The tail lamp 100 illustrated in FIG. 11 includes a light guide body 123. In the same manner as the tail lamp 20 of the above-described exemplary embodiment, the light guide body 123 also includes a first rod-shaped light guide portion 125, a second rod-shaped light guide portion 126, and a plate-shaped light guide portion 127 formed in the area between the first rod-shaped light guide portion 25 and the second rod-shaped light guide portion 26. The light emitted from a first LED 121 is incident on the incident end surface of the first rod-shaped light guide portion 125, and the light emitted from a second LED 122 is incident on the incident end surface of the second rod-shaped light guide portion 126. The tail lamp 100 according to the present exemplary embodiment differs from the tail lamp 20 according to the above-described exemplary embodiment in that the second rod-shaped light guide portion 126 is disposed not to intersect with the first rod-shaped light guide portion 125.

In the same manner as the plate-shaped light guide portion 27 of the above-described exemplary embodiment, in the plate-shaped light guide portion 127 of the present exemplary embodiment, an end side surface 127c is formed as a curved surface that is recessed toward the incident end surface side. Thus, because a portion of the light incident on the end side surface 127c of the plate-shaped light guide portion 127 is totally reflected at the end side surface 127c toward the first rod-shaped light guide portion 125 and the second rod-shaped light guide portion 126, the amount of light emitted from the end side surface 127c is reduced, and thus the light emission intensity of the end side surface 127c can be suppressed. As a result, the uniformity of light emission can be improved.

The present disclosure has been described above based on the exemplary embodiments. It will be understood by a person skilled in the art that the exemplary embodiments are given by way of example, and various modifications can be made by combining respective constituent elements or respective processes, and the modifications fall in the scope of the present disclosure.

For example, although the above-described exemplary embodiments illustrate an LED as a light source, the light source is not limited to the LED, and may be, for example, a semiconductor laser or a bulb.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A vehicle lamp comprising:
   a light source; and
   a light guide body configured to guide light from the light source therein and emit the light toward a front side of the lamp,
   wherein the light guide body includes:
      a first rod-shaped light guide portion configured to guide incident light from an incident end surface to a terminal end of the first rod-shaped light guide portion;
      a second rod-shaped light guide portion configured to guide a portion of the incident light to a terminal end of the second rod-shaped light guide portion; and
      a plate-shaped light guide portion formed in an area between and attached to each of the first rod-shaped light guide portion and the second rod-shaped light guide portion,
   wherein the plate-shaped light guide portion includes a curved end side surface, formed to span an area between the terminal end of the first rod-shaped light guide portion and the terminal end of the second rod-shaped light guide portion, and configured to reflect a portion of the incident light, which travels in the plate-shaped light guide portion, toward at least one of the first rod-shaped light guide portion or the second rod-shaped light guide portion.

2. The vehicle lamp of claim 1, wherein the end side surface is formed as a curved surface that is recessed toward the incident end surface side.

3. The vehicle lamp of claim 1, wherein a portion of the first rod-shaped light guide portion near the incident end surface is curved and formed such that a diameter thereof is reduced toward the incident end surface.

4. The vehicle lamp of claim 3, wherein a portion of the first rod-shaped light guide portion near the incident surface is cut out forming a surface therein such that the incident light is reflected by the surface and thereby guided by the first rod-shaped light guide portion.

5. The vehicle lamp of claim 1, wherein at least one of the first rod-shaped light guide portion or the second rod-shaped light guide portion includes a flat surface that is formed on a portion of a side surface thereof.

6. The vehicle lamp of claim 1, wherein the second rod-shaped light guide portion is formed to branch from the first rod-shaped light guide portion and extend therefrom.

7. The vehicle lamp of claim 1, wherein the second rod-shaped light guide portion is disposed not to intersect with the first rod-shaped light guide portion.

8. The vehicle lamp of claim 1, wherein the end side surface is formed as a curve such that the portion of incident light travelling through the plate-shaped light guide portion being emitted from the end side surface is reduced.

9. A vehicle lamp comprising:
   a light source; and
   a light guide body configured to guide light from the light source therein and emit the light toward a front side of the lamp,
   wherein the light guide body includes:
      a first rod-shaped light guide portion configured to guide incident light from an incident end surface;
      a second rod-shaped light guide portion branching from the first rod-shaped light guide portion within a plane near the incident end surface, the second rod-shaped light guide portion bending to extend linearly therefrom in a downward direction relative to the plane, the first rod-shaped light guide portion being curved after branching from the second rod-shaped light guide portion and bending to extend therefrom in the downward direction relative to the plane, the second rod-shaped light guide portion configured to guide a portion of the incident light; and
      a plate-shaped light guide portion formed in an area between the first rod-shaped light guide portion and the second rod-shaped light guide portion,
   wherein the plate-shaped light guide portion includes an end side surface configured to reflect a portion of the incident light, which travels in the plate-shaped light guide portion, toward at least one of the first rod-shaped light guide portion or the second rod-shaped light guide portion.

10. The vehicle lamp of claim 9, wherein only a portion of an end of the second rod-shaped light guide portion is connected to the first rod-shaped light guide portion.

11. A vehicle lamp comprising:
    a light source; and
    a light guide body configured to guide light from the light source therein and emit the light toward a front side of the lamp,
    wherein the light guide body includes:
       a first rod-shaped light guide portion configured to guide incident light from an incident end surface to a terminal end of the first rod-shaped light guide portion;
       a second rod-shaped light guide portion configured to guide a portion of the incident light to a terminal end of the second rod-shaped light guide portion;
       a plate-shaped light guide portion formed to span an area between the terminal end of the first rod-shaped light guide portion and the terminal end of the second rod-shaped light guide portion; and
       a fixing hole provided in the plate-shaped light guide portion;
    wherein the plate-shaped light guide portion includes a curved end side surface configured to reflect a portion of the incident light, which travels in the plate-shaped light guide portion, toward at least one of the first rod-shaped light guide portion or the second rod-shaped light guide portion.

12. The vehicle lamp of claim 11 further comprising a support portion extending from a body of the vehicle lamp, wherein the support portion is configured to be inserted into the fixing hole.

* * * * *